United States Patent [19]
Gundlach

[11] Patent Number: 5,207,075
[45] Date of Patent: May 4, 1993

[54] METHOD AND MEANS FOR PRODUCING IMPROVED HEAT PUMP SYSTEM

[76] Inventor: Robert W. Gundlach, 2434 Turk Hill Rd., Victor, N.Y. 14564

[21] Appl. No.: 762,488

[22] Filed: Sep. 19, 1991

[51] Int. Cl.$^5$ .............................................. E03B 7/12
[52] U.S. Cl. ........................................ 62/434; 62/260; 62/114; 62/333; 237/2 B
[58] Field of Search ............... 62/434, 435, 430, 114, 62/238.1, 238.5, 324.1, 324.2, 327, 238.7, 260, 332, 333, 334; 237/2 B

[56] References Cited

U.S. PATENT DOCUMENTS

| | | | |
|---|---|---|---|
| 2,101,953 | 12/1937 | Oman | 62/434 |
| 3,869,870 | 3/1975 | Kuehner | 62/114 |
| 3,906,742 | 9/1975 | Newton | 62/332 |
| 4,554,797 | 11/1985 | Goldstein | 62/434 |
| 5,123,262 | 6/1992 | Laude-Bousquet | 62/434 |

OTHER PUBLICATIONS

Robert Gannon, Ground-Water Heat Pumps, Feb. 1978, Popular Science, pp. 78-82.
N.Y. State Energy Research Development Authority, Ground-Source Heat Pumps, pp. 1-21.
C. P. Gilmore, How To Win With ACES, Jul. 1981, Popular Science, p. 49.
E. F. Lindsley, Heat Pumps Go Underground, Oct., 1983, Popular Science, pp. 106-108.
Rochester Gas & Electric, That's The Heat Pump Story, 1975, pp. 1-5.

Primary Examiner—Richard A. Bertsch
Assistant Examiner—William C. Doerrler
Attorney, Agent, or Firm—Shlesinger, Fitzsimmons & Shlesinger

[57] ABSTRACT

There is disclosed a heat pump comprising a vapor-compression refrigeration system wherein the heat pump evaporator extracts heat from a low temperature heat exchanger in the form of a water-immiscible fluid, and delivers the extracted heat to another location by means of a condenser. The water-immiscible fluid is maintained at a temperature of virtually 0° C. by the injection of many small droplets of water that freeze to form beads of ice as they settle in the fluid. The beads can then be separated and delivered to a combined ice-water reservoir. The heat extracted from the water-immiscible fluid and the injected water droplets is replaced in the ice-water reservoir from natural heat sources, such as a ground loop, a solar panel or an air-water heat exchanger. The heat provided by the ice-water reservoir includes its latent heat of fusion, which acts as a buffer when heat demand exceeds the rate of heat available from natural sources.

21 Claims, 4 Drawing Sheets

METHOD AND MEANS FOR PRODUCING IMPROVED HEAT PUMP SYSTEM

BACKGROUND OF THE INVENTION

This invention relates to a novel method and means for producing an improved heat pump system, and more particularly to a novel means for extracting heat form a low-temperature water source. Even more particularly this invention relates to novel means for extracting heat from a combined ice-water reservoir equipped with any one of a variety of natural heating means for continuously melting a portion of the ice in said reservoir.

Heat pumps have long been known and typically include a compressor which takes a refrigerant from a low temperature, low pressure evaporator and delivers it at high pressure and temperature to a condenser. The heating of the inside of homes and other buildings is accomplished by utilizing the heat given up at the condenser. The following systems have found commercial application, but none has replaced fossil fuel heating in a major way.

Air-to-Air Systems

In most common heat pump systems in use today, the heat absorbed by the refrigerant at the evaporator is extracted form the outdoor air. In temperate climates there is usually sufficient heat in the outdoor air to make this heat pump system reasonably efficient. For example, at air temperatures above about 10° C,. (50° F.) the efficiency of the heat pump is relatively high. However, as the air temperature approaches the freezing point of water (0° C.) and falls even lower, the efficiency of the heat pump is reduced drastically. At such low outdoor air temperature most air-to-air heat pumps automatically couple electrical resistant heating along with the action of the heat pump to provide sufficient heat to a structure being heated.

Depending on the relative humidity of the air and the velocity of air flow over the evaporator coils, the first practical problem encountered is the formation of frost, a loose, highly insulating structure of ice crystals and air, on the surface of the evaporator coils. This commonly begins at ambient air temperatures as high as 5° C. (41° F.), and sometimes is encountered up to 10° C. (50° F.). Such coatings of frost drastically impede the transfer of heat energy into the evaporator. Most air-to-air heat pumps are programmed to periodically reverse their cycle to melt this accumulated frost coating. Such defrost cycles take a considerable toll on the efficiency of the heat pump system.

Figure 1:
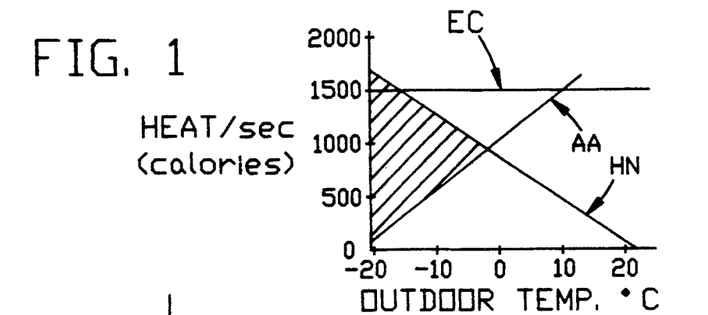
FIG. 1 is a diagram illustrating graphically the effect of outdoor temperatures on air-to-air and earth-coupled heat pump systems.

As the outdoor air temperature drops below the freezing point, efficiency drops additionally because there is simply less heat available from a given mass of air. Even in climates south of the central U.S. (N. Carolina to Northern California), practical average COP (coefficient of performance) for air-to-air systems falls between 1.8 to 2.2. Drawing FIG. 1 herein shows graphically the effects of outdoor temperatures on the heat needed (curve HN) and on the heat made available by, respectively, an air-to-air heat pump system (curve AA) and the hereinafter described earth-coupled system (curve EC). Note that the balance point is the outdoor temperature at which the heat delivered by the air-to-air heat pump (Curve AA) can just match the heat needed for maintaining a home at about 20° to 22° C. At temperatures below the balance point, supplemental heat must be added to maintain comfort in the home.

Ground Water Systems

One attempt to overcome the problem of low outdoor temperatures is to use percolating ground water as the medium from which heat is extracted. Ground water heat pumps are described in an article by Robert Gannon, published by *Popular Science* magazine in February, 1978, pages 78 to 82. The use of ground water as the heat source provides a gain in the efficiency of the heat pump system because the water is usually at a constant temperature year round and can be as high as about 15° C. (60° F.), although it is usable at temperatures as low as 4° C. (38° F.) or near the freezing temperature of water.

Ground water heat pumps have not attained popular use for many reasons. First, such a system is significantly more expensive to install than an air-to-air heat pump system. It is estimated that 15-20 percent of the ground water in this country would be unsuitable because of mineral content which causes scaling. Available water volume is also a serious problem since the flow rate of the underground vein may vary seasonally or may never achieve adequate flow in the area in which the heat pump is desirably located. Typically about 44 liters per minute (12 gal/min) are required for this application. As is pointed out in the above-mentioned *Popular Science* article, care must be taken to avoid reducing the temperature of the ground water to its freezing point, as such cooling could harm the system, or, at least, impede heat transfer by the collection of ice on the evaporator coils.

Earth-Coupled Water Systems

Still another system concept has emerged over the last decade and is slowly gaining commercial acceptance. This is the use of recycled water, thermally coupled to the earth by lengthy pipes buried underground well below the frost line. In some cases about 500 meters of 3 cm diameter tubing of polybutylene or heavy duty polyethylene is buried parallel to the surface 2 meters underground, and in some cases of more congested area the pipes are installed vertically. (Ground water open loop and earth-coupled closed loop water systems are more fully described in "A Technical Guide To Ground Source Heat Pumps", by New York State Energy Research and Development Authority, Two Rockefeller Plaza, Albany, N.Y. 12223.) Earth-coupled water avoids waste of water, and depleting the water table, but it reduces the working temperature of the evaporator coil to about 0° C. (the earth-coupled water enters the evaporator exchanger at about 3.3° C. and returns to the ground loop at 0° C.). Even so, the COP (coefficient of performance) of earth-coupled heat pump systems is reportedly at 3.0 to 3.8. To avoid the risk of freezing water on the evaporator pipes, antifreeze liquids (glycols) are added to the recycled water. As the water temperature drops below 0° C. the COP of the heat pump drops; also, the soil around the underground pipes might freeze and cause cavitation, diminishing thermal coupling efficiency with the soil.

ACES Ice and Water System

There has been reported by the Oak Ridge National Laboratory a system wherein the heat pump extracts heat from a reservoir of water to form ice, which is then employed to cool the house during periods of relatively higher temperature. This publication appears in *Popular Science* magazine in the month of July, 1981, page 49. The agency compares the heat pump system to five alternatives in an annual cycle energy system (ACES). In such a system the energy needs for home heating, home cooling and hot water supply for home use are considered. There must therefore be provided a reservoir of sufficient size so as to hold all of the ice produced by the heat pump during the entire heating season. Of course, a balance between the heating/cooling needs is seldom found even if one were to provide sufficient storage for the amount of ice accumulated during an entire heating season. Further, a considerable amount of expansion will occur with the conversion of a significant amount of water into ice producing enormous stresses on the evaporator coil structure. Also, a severe problem of heat conductivity is incurred in the operation, which involves conversion of such large volumes of water to ice as is required by the ACES method. For example, it is estimated that an average home in Tennessee would require the heat/cooling energy balance which equates to annually producing a block or mass of ice having a volume of about 140 m$^3$, or 140 metric tons. In Rochester, N.Y., (7,000 heating-degree days) the requirement would be about 275 m$^3$. In Denver each winter experiences 10,000 heating-degree days, which would require about 393 m$^3$ of ice to be produced and stored. Such a system cannot be easily nor economically operated.

Aside from the problem of storing such large volumes of ice, the key problem in extracting the latent heat of fusion from water is that ice forms on the surface of the heat extracting means, impeding the flow of heat according to the equation:

$$F = \frac{\lambda_i A \Delta T}{t} \text{ (cal/sec)}$$

where F is the flow of heat in cal/sec, $\lambda_i$ is the conductivity of ice ($6 \times 10^{-3}$ cal/cm ° C., $\Delta$ T is the temperature difference across the ice layer (in ° C.), and t is the thickness of the ice layer in cm.

The nature of the problem is illustrated by the following practical example. Assume a maximum requirement of heat flow to the evaporator of 1000 cal/sec (some areas in the U.S. will reach 2,000 to 3,000 cal/sec):and assume a heat extracting surface (e.g., the evaporator coils of the heat pump) at a temperature of $-1.0°$ C. If ice can be shaved or ground off to maintain a thickness of 3 mm (1/8 inch), then the surface area required is:

$$A = \frac{Ft}{\lambda_i \Delta T} = \frac{1000 \times 0.3}{6 \times 10^{-3} \times 1} = 5 \times 10^4 \text{cm}^2 = 5\text{m}^2$$

It would be very costly to provide a heat-extracting surface area of 5 m$^2$ with a coating of ice that can be shaved, milled, or ground down to an average thickness of ice not greater than 0.3 cm. The area can be reduced only in proportion to a reduction in the ice thickness, and the practical difficulties of maintaining a lower tolerance in thickness presents a serious engineering challenge.

Because the cost of energy is increasing rapidly, the efficient use of natural heat sources is very cost effective. There is a need for an efficient heating means which converts naturally available thermal energy to useful input for heat pump systems.

It is an object of this invention, therefore, to provide an efficient heat pump which does not allow ambient outdoor conditions to modify its efficiency.

Another object of this invention is to provide a heat pump system which extracts heat from water to a degree of efficiency heretofore unobtainable.

Another object of this invention is to provide a heat pump system wherein the heat extracted from the water medium is replenished by natural heat sources.

Another object of this invention is to provide an earth-coupled heat pump system wherein the latent heat of fusion is extracted from water without forming ice on the evaporator of the heat pump and without risk of freezing the ground in contact with the system's earth-coupled coils.

Another object of this invention is to provide a more energy efficient means for creating ice for food storage in the kitchen, or during shipment, or while camping or picnicing.

Another object of this invention is to provide a heating system for heating buildings such as homes and other structures.

Other objects of the invention will be apparent hereinafter from the specification and from the recital of the appended claims, particularly when read in conjunction with the accompanying drawings.

SUMMARY OF THE INVENTION

The concept of the present invention provides an efficient means of increasing the area of ice, while reducing the thickness of ice through which heat must flow in order to extract from the water its latent heat of fusion, and to deliver such heat to the absorber (evaporator) end of a heat pump. This is effected by immersing the evaporator coils of a heat pump in a water immiscible fluid into which are injected small droplets of water for delivering their heat of fusion (80 cal/g) to the heat pump at the rate necessary for the system application. The refrigerant in the evaporator coils maintains the water-immiscible fluid, which by way of example may be kerosene, at at approximately 0° C., so that the droplets of water begin to turn to ice as heat is extracted therefrom by the cold fluid. The frozen droplets of water are returned to a combination ice-water reservoir where the ice is exposed to a natural heat source, whereby the ice is melted, thus replacing the heat removed by the evaporator, and subsequently is recirculated back as water droplets to the water-immiscible fluid.

The term "natural heat source" as used above is intended to mean not only the direct rays of the sun, but also indirect heat obtained by the absorption of the heat energy of the sun by the earth, itself, as well as the heat contained in the earth from natural sources In other words, the earth itself is employed as a heat supply. Any thermal mass at a temperature greater than the melting point of ice can be used to regenerate the reservoir of recycled water and ice. For example, warm or relatively warm circulating earth-coupled water can be utilized to warm the ice-water in the reservoir which then converts ice back to water therein, as will be more fully described below. Additionally, the energy of the sun can be utilized by a solar panel to heat the water of the reservoir. Alternatively, or additionally, warm air during periods such as the "January thaw" can be utilized to add energy to the ice-water of the reservoir by means of an air-to-water heat exchanger.

THE DRAWINGS

In order more fully to explain the invention, reference will be made to the accompanying drawings wherein.

PREFERRED EMBODIMENTS OF THE INVENTION

Figure 2:
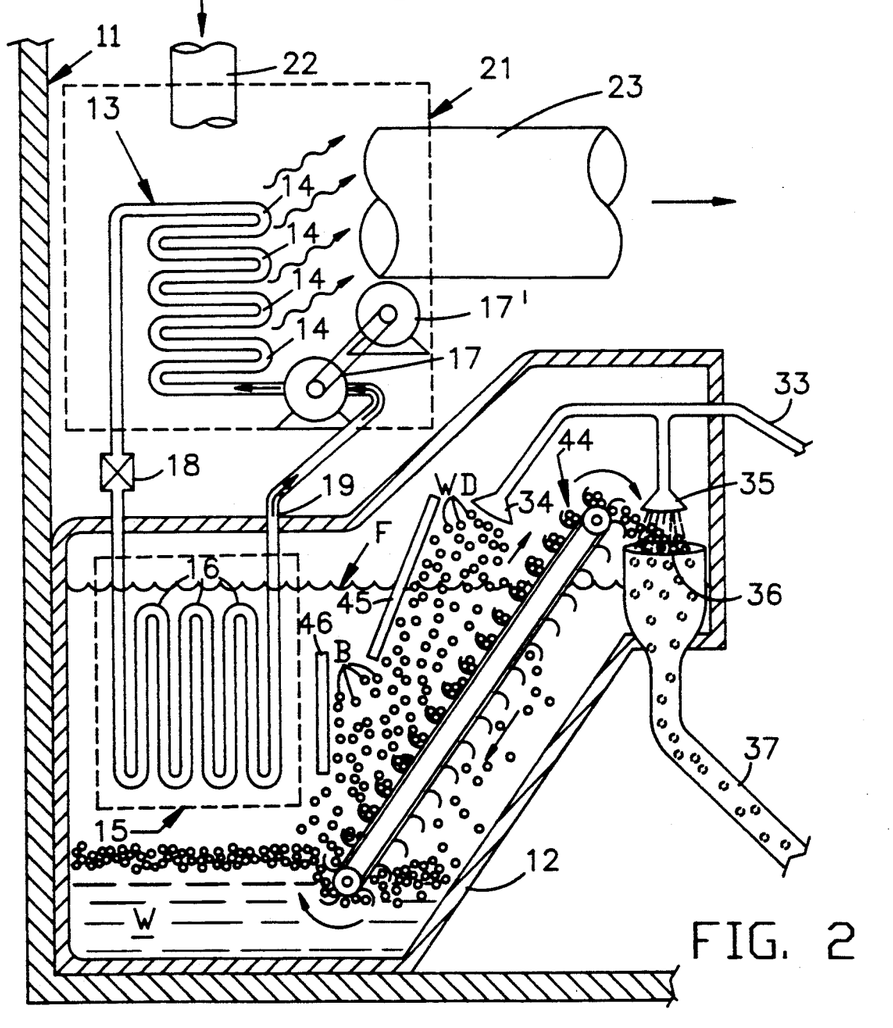
FIG. 2 is a diagramatic illustration of part of an improved heat pump system made in accordance with one embodiment of this invention, the system's novel heat exchanger being shown fragmentarily.
Figure 3:
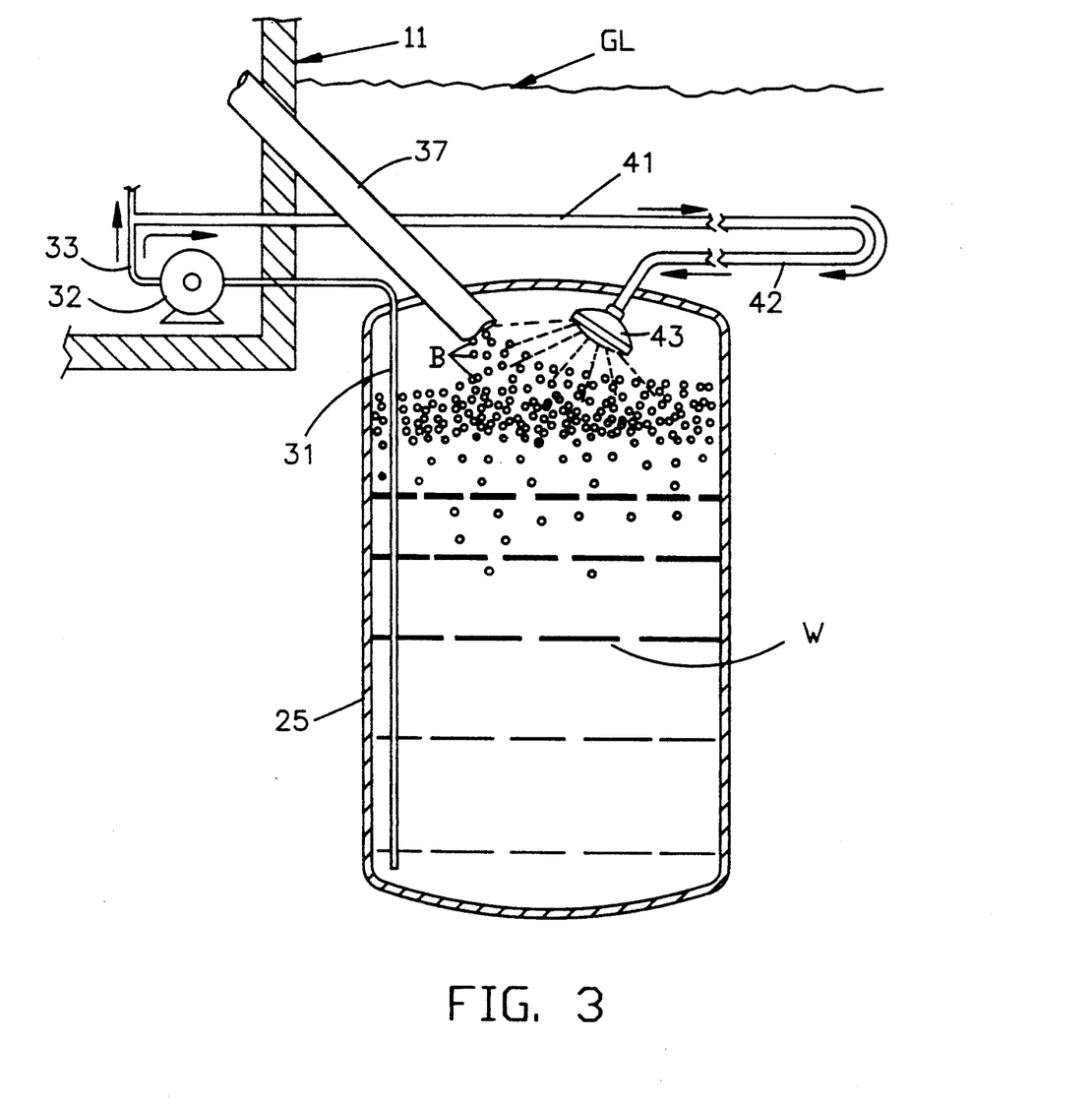
FIG. 3 is a diagramatic view of the remaining portion of this system, and illustrating fragmentarily a combined ice and water reservoir and associated ground loop which forms the low temperature heat source for this system.

Referring now to the drawings by numerals of reference, and first to FIGS. 2 and 3, 11 denotes generally part of a house or other structure containing portions of an improved earth coupled heat pump system made in accordance with this invention. Those portions of the system that are located within the house 11 comprise a heat exchanger tank 12 (FIG. 2) which contains a large supply of a water-immiscible fluid F, The fluid F, which by way of example may be kerosene, is lighter than water, and therefore floats on a layer W of water which is located in the bottom of tank 12.

Also mounted in house 11, and in or adjacent the tank 12, are the other conventional elements of a heat pump—namely, a condenser 13 having a plurality of condenser coils 14 that are located externally of tank 12, an evaporator 15 having a plurality of evaporator coils 16 that are immersed in fluid F, a compressor 17 which is operated by a motor 17', and an expansion valve 18 which connects the output of the condenser 13 to the input of the evaporator 15. As is well known by those skilled in the art, when the compressor 17 is placed in operation, it compresses a conventional refrigerant that is discharged to the coils 14 of the condenser 13, at which time the refrigerant condenses or liquifies, thus giving up its heat of vaporization. This heat is emitted from the condenser coils 14; and the liquid refrigerant then slowly passes through the expansion valve 18 to the evaporator coils 16 where, now under reduced pressure, it vaporizes or returns to its gaseous state. The evaporation of the refrigerant extracts its latent heat of vaporization from the ambient surrounding the coils 16, which in this embodiment constitutes the fluid F. The vaporized refrigerant then returns via line 19 to the inlet of compressor 17.

In FIG. 2, the subject matter enclosed by the broken line denoted by numeral 21 refers to the system's heat recovery section. In addition to the condenser 13 this section includes a first conduit 22 for permitting the entry of relatively cool air into the condenser unit 13, and a second conduit 23 for delivering in any conventional manner to the house 11 warm air which is produced by the heat that is emitted by the coils 14 of condenser 13.

Referring now to FIG. 3, in order to supply heat to the water-immiscible fluid F, tank 12 is connected to a combined ice-water reservoir contained in a large tank 25 that is buried below ground level GL in the earth adjacent to the house 11. Secured in the upper end of tank 25 is an elongate water supply pipe 31, the lower end of which is positioned slightly above the bottom of tank 25 so as to be in communication with the water therein. At its opposite end pipe 31 enters the house 11 and is connected to the inlet of a pump 32, which pumps water from the reservoir 25 through a sprinkler line 33 to a pair of sprinkler heads 34 and 35 (FIG. 2), which are mounted in the tank 12. Sprinkler head 34 overlies the upper surface of the fluid F in tank 12, and head 35 overlies the upper, generally funnel shaped end 36 of an ice recirculating chute or duct 37, the opposite, lower end of which extends out of the house 11 and into the upper end of the reservoir or tank 25(FIG. 3).

Referring again to FIG. 3, the inlet end of an elongate ground loop pipe 41 branches from sprinkler line 33 and forms intermediate its ends one or more elongate ground loops 42 (only one of which is illustrated in FIG. 3), which are buried in the earth beneath ground level GL. At its opposite end pipe 41 is connected to another sprinkler head 43, which is mounted in the upper end of tank 25 to overlie its ice-water contents.

When the above-noted earth coupled system is placed in operation, pump 32 is operated at the same time that the compressor 17 circulates refrigerant through the evaporator coils 16. Consequently, water droplets WD (FIG. 2) are continuously injected or dispensed into fluid F from the head 34 during the operation of the heat pump system. As heat is withdrawn by the evaporator 15 from the water-immiscible fluid F, it is replaced by the incoming water droplets, and the temperature of fluid F is therefore prevented from dropping much below 0° C. The reason is that when they strike the fluid F and begin to drop downwardly therein, the droplets WD begin to freeze from the outside in, thus forming small beads B of ice (FIGS. 2-6), because they have a specific gravity greater than that of fluid F, which fall slowly in the fluid F toward the layer of water W in the bottom of tank 12. The small beads of ice settle on the surface of the water W in the tank 12, from where they are continuously conveyed upwardly in tank 12 by an endless conveyor belt 44 (FIG. 2) of conventional design. Belt 44 has sieve-like buckets to collect and convey the beads B of ice upwardly out of the tank 12 and into the funnel-shaped upper end 36 of the chute 37 while leaving the water immiscible fluid in tank 12. The beads of ice are thus conveyed by chute 37 into the upper end of the reservoir or tank 25, together with water which is continuously sprayed out of the head 35 into the upper end of the chute 37 during the operation of pump 32. To deflect the beads of ice from evaporator coils 16, and toward the conveyor belt 44, while allowing convection of the warmed fluid to the top of evaporator coils 16, spaced baffles 45 and 46 (FIG. 2) may be mounted in the tank 12 to extend transversely between opposite sides thereof.

Referring again to FIG. 3, as the beads of ice are discharged from chute 37 into the reservoir 25, heat is added to the ice in order to cause it to remelt back into water. This heat is derived from the ground loop 42, which, via the pump 32, continuously circulates water from the bottom of tank 25 through the large ground loop 42 and then back to the sprinkler head 43, which sprinkles onto the ice in the upper end of tank 25 water which is at a temperature above 0° C. Water from the ground loop 42 thus replenishes the heat which was previously withdrawn from the water discharged from the heads 34 and 35.

For example, the average house in the northeast U.S. requires a peak heating capacity during January and February, the coldest months of the year, of 35,000 Btu/hr, or 10.5 kw, or 2,450 cal/sec. For a conventional heat pump system with a coefficient of performance (COP) of 3.0, one third of the output is derived from the power driving the associated compressor and fans; i.e., the electrical power consumed by the heat pump system; while $\frac{2}{3}$ must come from the heat input to the system evaporator. Therefore, the water-immiscible fluid F of this novel system must provide up to 1633 cal/sec to the evaporator 15 during peak periods of heating needs. At 80 cal/g for the latent heat of fusion of water, that requires the freezing of 20.4 grams of water per second in the immiscible fluid, while half that rate, or 10.2 g/sec will be remelted in the ice-water reservoir 25 by natural heat sources.

When the above-described heat pump system is supplied with recirculating water from the earth-coupled pipes as shown in FIG. 3, the capacity of the earth-coupled pipes needs be sufficient to supply not the peak demand rate of heat to the reservoir, but only the average rate of heat needed. This is because the reservoir can temporarily supply heat energy whenever the outdoor temperature falls below the average Jan.-Feb. temperature, forming ice as heat is extracted at above average rates, which will be melted by the earth-coupled water during similar periods of above average temperatures. By definition of *average*, the periods of above and below average temperatures will be equal in the long run. To be specific, during the average January and February days and nights, then, 10.2 g/sec of ice are formed in the water-immiscible fluid of the evaporator exchanger, and 10.2 g/sec are melted in the ice water reservoir by the circulating earth-coupled water. In periods of peak cold, up to 20.4 g/sec will be injected and frozen, and 10.2 g/sec of that will be continuously melted, for a net gain of 10.2 g/sec of ice in the reservoir. A period of peak cold for seven days in succession would be extremely rare. At 10.2 g/sec×3600 sec/hr×24 hr/day×7 days=6.17×10$^6$ grams=6.17 m$^3$ of water. Such ice accumulations will be melted during periods of above average temperatures. Thus, the maximum expected deviation below average temperature×time defines the volume of the ice water reservoir needed. In areas where the ground is relatively free of rocks and is easily drilled or excavated for trench burial of pipes, earth-coupled coils will be the primary means of recovering heat from natural heat source or panels.

Figure 4:
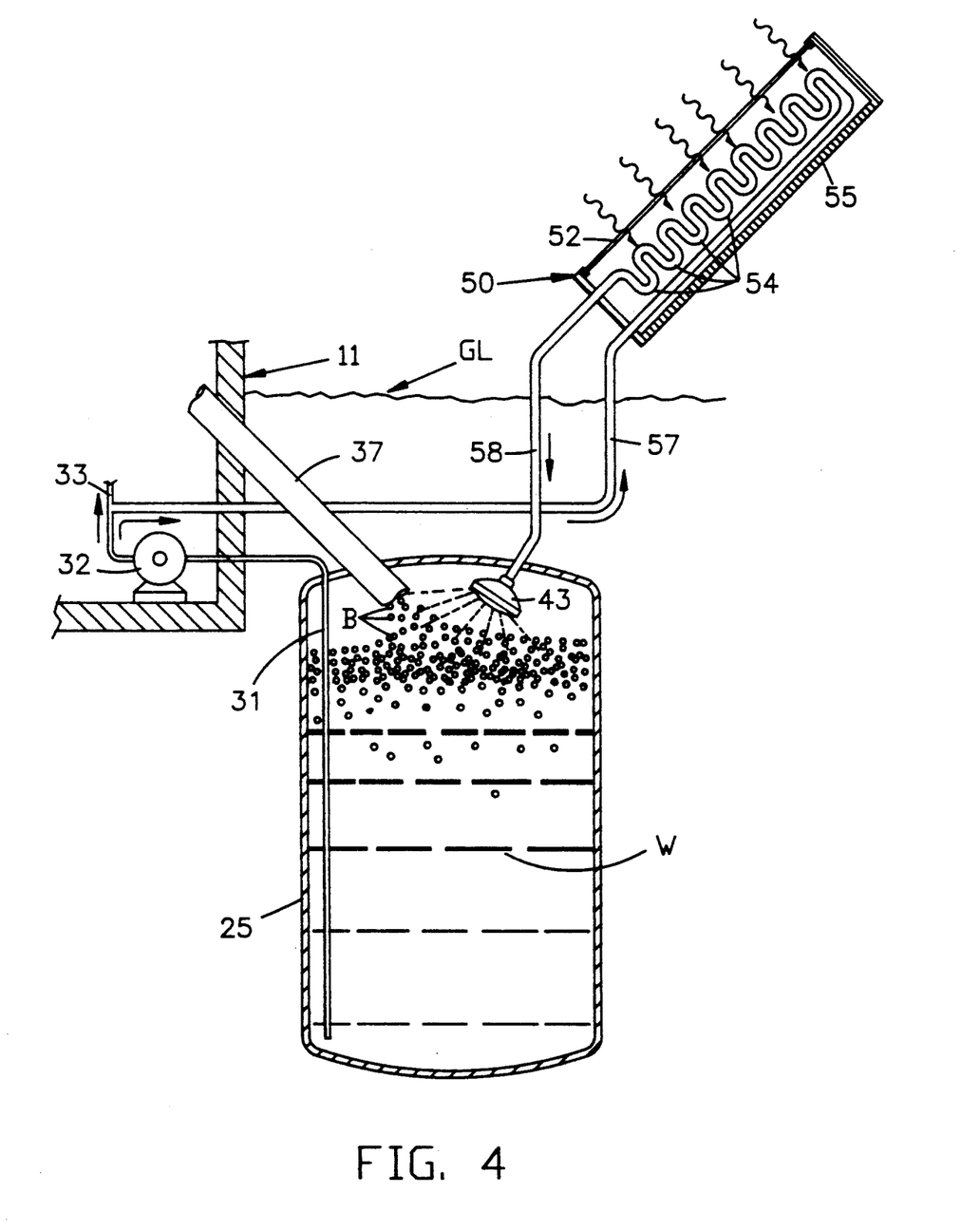
FIG. 4 is a diagramatic view similar to FIG. 3 but illustrating a solar collector means which may be used in place of or in combination with the ground loop shown in FIG. 3.

Referring now to the embodiment shown in FIG. 4, wherein like numerals are employed to denote elements similar to those shown in the embodiments of FIGS. 2 and 3, numeral 50 denotes generally a solar panel which may be substituted as the heat source in place of, or may be combined with, the ground loop 42 employed in the first embodiment. Panel 50, which may be of conventional design, is mounted in any conventional manner above ground level GL in communication with an associated ice-water reservoir 25 which is buried below ground level as in the first embodiment. Panel 50 may include the usual glass or polycarbonate cover 52, and a series of heat absorbing coils 54 supported on a collector plate 55. The series connected coils 54 have an inlet end connected by a pipe 57 to the sprinkler line 33 in house 11, and an outlet end connected via a pipe 58 to the sprinkler head 43.

When the system shown in FIG. 4 is placed in operation, ice water is pumped by pump 32 through the coils 54 and pipe 58 back to the sprinkler head 43 in tank 25. The ice beads B which are returned to tank 25 are melted by solar heat which warms the water circulating through panel 50. In outer space above the earth's atmosphere, the solar radiation power density is 1.4 kW/m$^2$. At sea level, the solar power density is diminished by atmospheric absorption to just 1.0 kW/m$^2$. In areas known for abundant sunshine solar panels would warrant greater investment; and when used in combination with one or more ground loops 42, could function as the primary natural heat recovery means, thus permitting use of a reduced length of ground loop.

Figure 5:
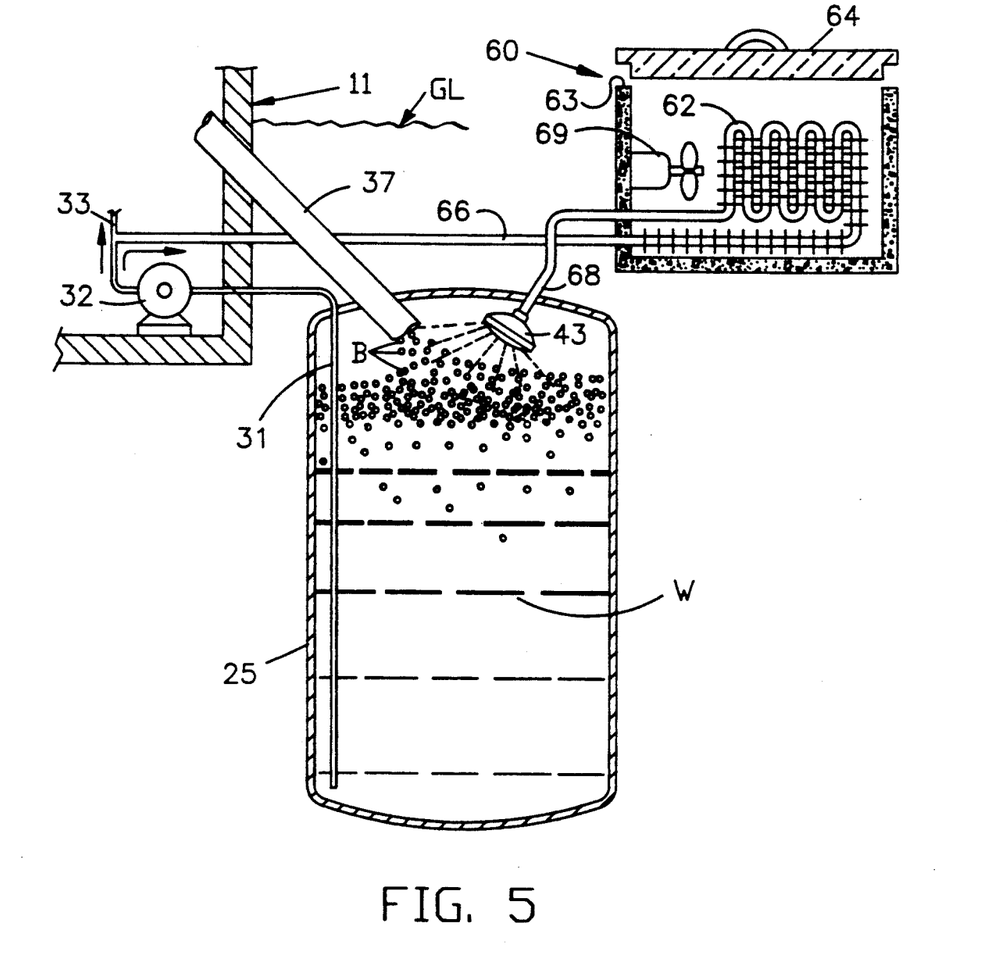
FIG. 5 is a diagramatic view similar to FIG. 3 but illustrating an air-water heat exchanger which may be used in place of or in combination with either the ground loop of FIG. 3 or the solar collector of FIG. 4.

In FIG. 5, numeral 60 denotes generally an air-water heat exchanger which may be used in place of or to supplement the previously described ground loop and solar panel exchangers, and which is not unlike that in common use in an automobile radiator to cool the engine coolant fluid Exchanger 60 comprises a series of radiator-type heater coils 62, which are mounted in a housing 63 having a closed end buried in the ground, and an open, upper end disposed at ground level GL, and adapted to be closed by a cover 64 when not in use. The series of coils 62 has an inlet end connected by a pipe 66 to the sprinkler line 33, and an outlet end connected by a pipe 68 to the sprinkler head 43 in tank 25. Also, a conventional electric fan 69 is mounted in housing 63 to blow air across coils 62.

In this embodiment the air-water exchanger 60 may be used to warm ice water from reservoir 25 whenever the outdoor air temperature exceeds, e.g., +5° C. In use, water from reservoir 25 is pumped by pump 32 through exchanger coils 62 where it will absorb energy from the warmer air blown by fan 69 through the air-water exchanger coils 62. The warmed water is then returned to ice-water reservoir 25 where it will melt ice in tank 25 to restock the reservoir for the next colder than average freezing spell.

Figure 6:
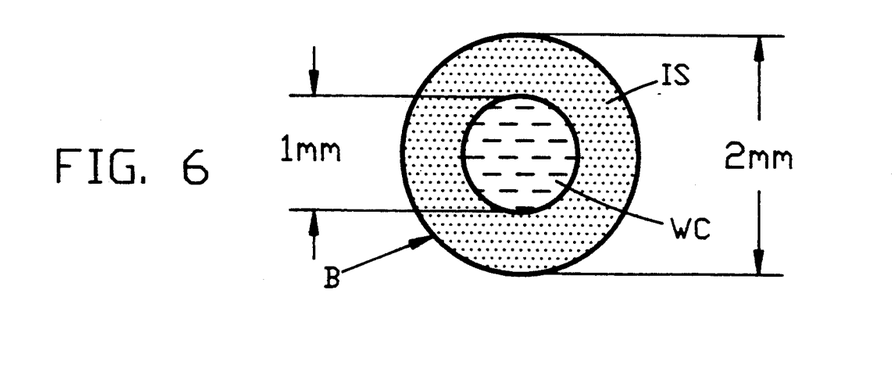
FIG. 6 is a diagramatic cross sectional view through the center of a droplet of water after it has been immersed in a water immiscible fluid with a specific gravity less than that of ice, and having a temperature below 0° C.

The spectacular effectiveness of this process for creating a large total surface area to freeze ice without building up thick insulating coatings of ice on heat absorbing surfaces will be more fully appreciated in consideration of the following practical example:

Consider an example of the water droplet of 2 mm diameter as shown in FIG. 6. When a shell of ice $\frac{1}{2}$ mm thick has formed surrounding a core of water of $\frac{1}{2}$ mm radius, $\frac{7}{8}$ of the mass of the droplet has already frozen, and its latent heat of fusion has transferred through an average thickness t of ice less than $\frac{1}{4}$ mm or 0.025 cm.

From the heat flow equation, $$\text{heat/time} = F = \frac{A\lambda_i \Delta T}{t}$$

we can calculate the time taken to freeze that ⅛ of the droplet, assuming it is suspended in a medium at a temperature of −0.5° C.

The heat of fusion, at 80 cal/g = 80×mass = 80×vol.
Volume = ⅛×4/3 πr³ = 0.0037 cm³ = 0.0037 g.
Heat = 80×0.0037 = 0.30 cal.

$$\text{Time} = \frac{H_t \times t}{A\lambda_i \Delta T} = \frac{0.3 \times 0.025}{0.13 \times 6 \times 10^{-3} \times 0.5} = 19 \text{ sec.}$$

Settling Rate

From Stoke's law, we can calculate the settling rate of droplets based on the density and viscosity of the suspension medium; in this case, the immiscible fluid. This has been done for kerosene, for example.

According to Stoke's law, the drag force on a spherical particle falling through a viscous medium of viscosity $\eta$ is:

$$F_{72} = 6\pi\eta \, a \, v,$$

where a = radius, v = velocity. and F = the restraiing, or viscous drag force. At terminal velocity, this will be equal to the net gravitational force Fg, which is:

$$F_g = 4/3\pi \, a^3(d_2-d_1).$$

Therefore, $4/3 \pi (d_2-d_1) = 6 \pi\eta a v$ so $$v = 0.22\frac{a^2}{\eta}(d_2 - d_1)$$

For water and kerosene, densities $d_2=1$, $d_1=0.7$, and viscosity $\eta$ for kerosene is about $2\times10^{-3}$ poise; so $v = 33 \, a^2$ (in cm/sec).

Hence, velocity for various radii are:

| Radius (cm) | 0.2 | 0.1 | 0.05 | 0.4 |
|---|---|---|---|---|
| Velocity ($\frac{cm}{sec}$) | 1.3 | 0.33 | 0.1 | 5.3 |

It is clear, then, that a droplet of 1 mm radius would take at least 150 sec to settle to the bottom of a heat exchanger vessel 50 cm deep. The same droplet would take only 19 second to freeze, as the discussion of FIG. 6 showed, so it settles only about 6 cm before it is frozen. Actually, since water expands upon freezing, the settling rate slows down as the ice shell forms around the droplet because both the buoyancy and also the viscous drag forces increase. Since the volume of each 2 mm droplet is $4/3 \pi r^3 = 0.0042$ cm³, and we can extract 80 cal/cm³ in freezing it, we get 0.335 cal per droplet. In order to supply the maximum 1633 calories per second, then, we need to freeze 4875 droplets per second. Injecting 5000 droplets per second, which will freeze as they settle through about 6 cm depth, in an exchanger vessel of, say, 50×50×50 cm³, would result in 5000 droplets per 50×50×6 = 15000 cm³, which comes to a droplet density of 1 droplet every 3 cm³. We should not anticipate, nor have tests showed any problem of agglomeration or coalescence.

From the foregoing, therefore, it will be apparent that the present invention provides a novel method and improved apparatus for producing an extremely efficient heat pump system which is suitable for use in a variety of different temperature and geographical ambients. Also, while this invention has been described in connection with the production of an efficient heating system, it will be readily apparent that it may be used as means for creating ice, and can thus function also as a cooling system such as ACES.

Moreover, although this invention has been illustrated and described in connection with only certain embodiments thereof, it will be apparent that this application is intended to cover such modifications as may fall within the scope of one skilled in the art and the appended claims.

I claim:

1. In the heat pump system having a compressor, a condenser, an expansion valve, and an evaporator operable to extract heat from a combined ice and cold water reservoir, the improvement comprising
   a vessel containing a water immiscible fluid,
   means for supporting said evaporator in said water immiscible fluid,
   means for delivering droplets of water to said fluid in said vessel from said combined ice and cold water reservoir, said evaporator being operative upon operation thereof to cause said droplets to turn to beads of ice in said fluid,
   means for separating said beads of ice from said fluid in said vessel and for conveying the separated beads of ice back to said reservoir, and
   means for recirculating cold water form said reservoir through a natural heat source to be warmed thereby, and to return the warmed water back to said reservoir thereby continuously to melt at least part of the ice in said reservoir.

2. In a heat pump system having a compressor, a condenser, an expansion valve, and an evaporator operable to extract heat from a combined ice and cold water reservoir, the improvement comprising
   means for supporting said evaporator in a water immiscible fluid,
   means for delivering droplets of water to said fluid from said combined ice and cold water reservoir, said evaporator being operative upon operation thereof to cause said droplets to turn to beads of ice in said fluid,
   means for conveying said beads of ice from said liquid back to said reservoir, and
   means for recirculating cold water from said reservoir through a natural heat source to be warmed thereby, and to return the warmed water back to said reservoir thereby continuously to melt at least part of the ice in said reservoir,
   said combined ice and cold water reservoir comprising a first tank buried in the earth and containing cold water and beads of ice conveyed thereto from said water immiscible fluid.

3. In a heat pump system as define din claim 2, wherein said natural heat source comprises a ground loop pipe buried in the earth adjacent said first tank, said pipe having an inlet end communicating with the interior of said tank to receive cold water therefrom, and an outlet end communicating with said tank to deliver said warmed water thereto.

4. In a heat pump system as defined in claim 2, wherein said natural heat source comprises a solar panel mounted adjacent said first tank in position to receive radiant energy from the sun, and including a heat exchanger coil having an inlet end communicating with the interior of said first tank to receive cold water therefrom, and having an outlet end communicating with said first tank to deliver said warmed water thereto.

5. In a heat pump system as defined in claim 2, wherein said natural heat source comprises an air to water heat exchanger mounted adjacent said first tank adjacent ground level, and including a radiator-type heat exchanger coil having an inlet end communicating with the interior of said first tank to receive therefrom cold water, and having an outlet end communicating with said first tank to deliver said warmed water thereto.

6. In a heat pump system as defined in claim 2, wherein said means for supporting said evaporator in said fluid comprises a second tank containing said water-immiscible fluid, said evaporator being mounted on said second tank and having a plurality of evaporator coils immersed in said fluid.

7. In a heat pump system as defined in claim 6, wherein said second tank includes a layer of water adjacent the bottom thereof, and said fluid floats on said layer of water.

8. In a heat pump system as defined in claim 6, wherein said means for delivering droplets of water to said fluid comprises
　a first pump having an inlet connected to said first tank to draw cold water therefrom, and an outlet connected to a sprinkler head, and
　means supporting said sprinkler head in said second tank above the surface of said fluid therein, whereby upon operation thereof said first pump causes droplets of cold water to be discharged from said head onto said fluid.

9. In a heat pump system as defined in claim 8, wherein said means for conveying beads of ice to said reservoir comprises
　a chute having an inlet end mounted adjacent the upper end of said second tank, and an outlet end communicating with said first tank, and
　means in said second tank for picking up and conveying beads of ice from said fluid to said inlet end of said chute for delivery thereby to said first tank.

10. In a heat pump system as defined in claim 9, including
　a second sprinkler head mounted in said second tank to overlie said inlet end of said chute, and
　means connecting said second head to the outlet of said first pump to receive and discharge cold water therefrom into said upper end of said chute.

11. A heating system for heating a structure comprising
　a water-immiscible fluid,
　an ice-water reservoir, and
　a heat pump including a compressor, a condenser, an expansion valve and an evaporator,
　said evaporator being located within said water-immiscible fluid whereby in operation of said evaporator heat is extracted thereby from said water-immiscible fluid, and is delivered to said structure via said condenser,
　said water-immiscible fluid and ice-water reservoir including heating means connected to a natural heat source, whereby the heat removed from said fluid by said evaporator is replaced in said ice-water reservoir by said natural heat source.

12. The heating system of claim 11, further including means for distributing throughout said structure the heat which is removed form said water-immiscible fluid.

13. The heating system of claim 11, wherein the heat extracted from said water-immiscible fluid includes the latent heat of fusion of water.

14. The heating system of claim 13, further including means to remove ice from said water-immiscible fluid.

15. A method of improving the efficiency of heat transfer from a low-temperature water source to the evaporator of a heat pump system of the type having a compressor, a condenser, an expansion valve and an evaporator, comprising
　positioning said evaporator in a water-immiscible fluid having a specific gravity less than ice, and from which heat is extracted by the evaporator at a rate sufficient to maintain the temperature of said fluid approximately at or slightly below 0° C.,
　supplying droplets of water to said fluid from a low temperature water source, and at a rate equal to or greater than the rate at which heat is extracted form said fluid, thereby to cause said droplets to form small beads of ice which settle downwardly in said fluid, and
　removing said beads of ice from said fluid.

16. A method of improving the efficiency of heat transfer from a low-temperature water source to the evaporator of a heat pump system of the type having a compressor, a condenser, an expansion valve and an evaporator, comprising
　positioning said evaporator in a water-immiscible fluid form which heat is extracted by the evaporator at a rate sufficient to maintain the temperature of said fluid approximately at or slightly below 0° C.,
　supplying droplets of water to said fluid from a low temperature water source, and at a rate equal to or grater than the rate at which heat is extracted form said fluid, thereby to cause said droplets to form small beads of ice in said fluid,
　removing said small beads of ice form said fluid,
　melting said beads after removal thereof from said fluid, and
　recirculating the melted ice beads to said fluid in the form of said droplets of water.

17. A method as defined in claim 16, including
　delivering said small beads of ice to said low-temperature water source upon removal of said beads form said fluid, and
　recirculating a portion of the water in said low-temperature water source through a heat exchanger and then back to said source, whereby said recirculated portion of said water functions to melt the ice beads delivered to said source.

18. In a heat pump system, the improvement comprising
　a vessel containing a layer of water, and a supply of water-immiscible fluid floating on said layer of water,
　means for supplying droplets of water to said fluid in said vessel, and
　means for extracting heat from said fluid in quantities sufficient to cause said droplets of water to turn to beads of ice in said fluid, and thereby to release their heat of fusion to said fluid.

19. In a heat pump system as define din claim 18, wherein said heat extracting mean so comprises a plurality of evaporator coils immersed in said fluid above said layer of water.

20. In a heat pump system as define din claim 19, wherein said means for supplying droplets of water to said liquid comprises
- a cold water reservoir,
- means for delivering water from said reservoir to said fluid in the form of said droplets, and
- means for recirculating said beads of ice form said fluid to said reservoir.

21. In a heat pump system as defined in claim 19, including means in said vessel for guiding said beads of ice away from said evaporator coils.

* * * * *